United States Patent [19]

Intichar et al.

[11] 4,380,712

[45] Apr. 19, 1983

[54] ARRANGEMENT FOR COOLING A SUPERCONDUCTING MAGNET WINDING

[75] Inventors: Lutz Intichar; Christoph Schnapper, both of Erlangen; Erich Weghaupt, Mülheim, all of Fed. Rep. of Germany

[73] Assignee: Siemens Aktiengesellschaft, Munich, Fed. Rep. of Germany

[21] Appl. No.: 254,612

[22] Filed: Apr. 16, 1981

[30] Foreign Application Priority Data

Apr. 23, 1980 [DE] Fed. Rep. of Germany ....... 3015682

[51] Int. Cl.$^3$ .............................................. H02K 9/00
[52] U.S. Cl. ...................................... 310/52; 310/61; 310/64; 62/514 R
[58] Field of Search .................. 310/10, 40 R, 52, 54, 310/53, 60 R, 61, 58, 59, 64, 65; 62/514 R; 336/60, 61, DIG. 1

[56] References Cited

U.S. PATENT DOCUMENTS

| 4,204,134 | 5/1980 | Fritz | 310/52 |
| 4,227,102 | 10/1980 | Rozenfeld et al. | 310/52 |
| 4,228,374 | 10/1980 | Elsel | 310/64 |
| 4,267,474 | 5/1981 | Kullmann | 310/52 |
| 4,277,705 | 7/1981 | Rios | 310/64 |
| 4,297,603 | 10/1981 | Weghaupt | 310/53 |
| 4,309,632 | 1/1982 | Muller et al. | 310/52 |
| 4,323,800 | 4/1982 | Hofmann | 310/52 |

OTHER PUBLICATIONS

Electric Power Research Institute, USA: "EPRI TD-255, Project 672-1, Final Report", Aug. 1976, pp. 45 to 52.
Electric Power Research Institute, USA: "EPRI EL-577, Project 429-1, Final Report", Nov. 1977, pp. 3-289 to 3-294.
Electric Power Research Institute, USA: "EPRI EL-663, vol. 1, Project 429-2, Final Report", Mar. 1978, pp. 2-112 to 2-114.
"Siemens-Forschungsund Entwicklungsberichte", vol. 5 (1976), No. 1, pp. 10-16.
A. Bejan: "Improved Thermal Design of the Cryogenic Cooling System for a Superconducting Synchronous Generator", PhD Thesis, Massachusetts Institute of Technology, USA, Dec. 1974, pp. 145-167.

Primary Examiner—R. Skudy
Attorney, Agent, or Firm—Kenyon & Kenyon

[57] ABSTRACT

The cooling arrangement of the superconducting field winding of a turbo-generator contains a coolant chamber, in which a vaporous and a liquid phase of a coolant are contained, and to the vapor space of which a coolant discharge line with a high flow resistance is connected. To prevent excessive over-pressure in the coolant chamber in the event of a quench, a buffer tank is also connected to the vapor space via a connecting path having a relatively low flow resistance.

8 Claims, 1 Drawing Figure

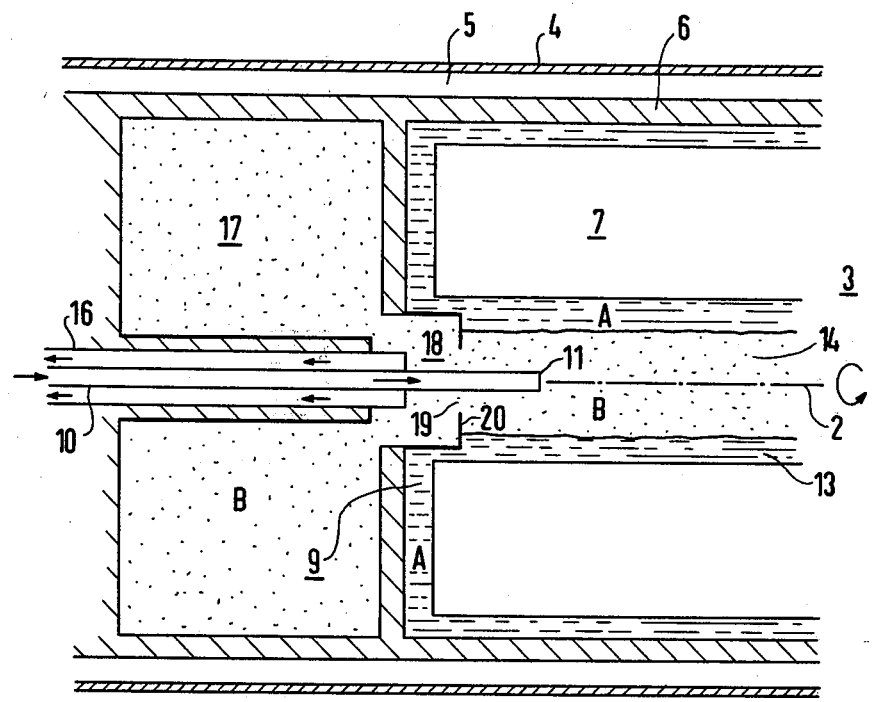

ARRANGEMENT FOR COOLING A SUPERCONDUCTING MAGNET WINDING

BACKGROUND OF THE INVENTION

This invention relates to an arrangement for cooling a superconducting magnet winding, particularly the superconducting field winding in the rotor of an electric machine.

Cooling arrangements for the superconducting field winding in the rotor of an electric machine with at least one coolant chamber which, in the operating condition, contains a vaporous phase and a liquid phase of a coolant, which is fed into it via at least one feed line, a liquid space in the chamber occupied by the liquid phase being connected to coolant paths through the magnet winding and a vapor space in the chamber occupied by the gaseous phase having connected thereto at least one coolant discharge line with a predetermined high flow resistance, are known. For example, such an arrangement for cooling a superconducting magnet winding is described in the report of the Electric Power Research Institute, USA: "EPRI TD-255, Project 672-1, Final Report", August 1976, pages 45 to 52. This magnet winding is the superconducting field winding of a turbo-generator. The helium required for cooling this field winding is conducted from an external refrigeration plant, via a rotating helium coupler, centrally through the rotor shaft and is fed into a coolant chamber provided there near the axis. The coolant chamber contains a two phase mixture of liquid and gaseous coolant. Due to the centrifugal forces acting on this two phase mixture, the liquid phase is accumulated in regions away from the axis and the vaporous phase in regions of the coolant chamber near the axis. The liquid coolant flows through the coolant paths of the field winding, whereby the incident or produced heat is given off to the coolant. The coolant flow takes place, in this known cooling arrangement, due to a so-called self pumping effect, in thermosiphon loops. The heat absorbed by the coolant causes a temperature rise and partial evaporation. The coolant vapor then accumulates in a central subspace of the coolant chamber. From this vapor space, gaseous coolant is removed via a coolant discharge line and can further be used, for instance, for cooling parts of the rotor body.

Superconducting magnet windings must generally be designed so that they are able to withstand a sudden transition from the superconducting to the normally conducting state, called a quench, without damage. In the event of such a quench, part of the energy magnetically stored in the winding is converted into heat within a short time. The heat, which is partly given off to the coolant in the process, leads to evaporating of the coolant and thus to a pressure increase in the cooling arrangement.

This situation is particularly critical in turbogenerators with superconducting field windings. For, the magnetic energy stored in these windings is generally so large that in the event of a quench all the coolant evaporates. Since, as a rule, additional overpressure valves and rupture discs are to be avoided, the pressure being generated in the part of the cooling arrangement contained in the rotor can be reduced only via the coolant discharge lines of the rotor. However, the flow resistances of these discharge lines are relatively high due to the limited space because of the field current lines and the necessary evacuating lines that must be accommodated in a rotor. In larger generators, these discharge lines are furthermore relatively long, for instance, several meters. In addition, these lines can be made large enough only with difficulty, since otherwise undesirable secondary effects, such a secondary flow, can occur. Such effects lead to increased heat flow and thus to increased dissipation losses. The size of the coolant chamber in the center of the rotor body, which contains the coolant liquid and the coolant vapor, is likewise very limited. However, enough liquid must be stored in this chamber so that a sufficient coolant reserve is available for all operating conditions that can be expected. Thereby, only very little space is available for the coolant vapor in the center of the rotor. In addition, contrary to non-rotating windings, a considerably better heat transfer is effected in the rotating superconducting windings due to the large centrifugal forces. As a result, the coolant also evaporates faster than in comparable non-rotating magnet windings. In such cooling arrangements, the amount of coolant vapor can then increase very steeply in the event of a sudden quench, so that, for instance, a pressure of 50 bar or more is reached. Then, the danger of parts of the cooling arrangement being ruptured exists unless special measures are taken.

It is therefore desirable to provide, for the cooling arrangement of a magnet winding, sufficiently wide and short coolant discharge lines, so that the coolant vapor can be given off, for instance, via an overpressure valve, to the atmosphere or into a collecting tank. Such measures cannot be realized, however, in all cases due to space limitations.

The coolant feed canals of the cooling arrangement have therefore been arranged in a superconducting field winding in such a way that, in the event of a quench, a large part of the coolant is conducted out of the rotor in liquid form through these canals. In the cooling system provided in the rotor, only a correspondingly small amount of coolant can then evaporate (see Report of the Electric Power Research Institute, USA: "EPRI EL-577, Project 429-1, Final Report", November 1977, page 3–289). There have also been attempts to lay out the cooling arrangement in the rotor of a superconducting generator in such a manner that relatively little coolant at all is available in the rotor (Report of the Electric Power Research Institute, USA: "EPRI EL-663, vol. 1, Project 429-2, Final Report", March 1978, pages 2–112 to 2–114). Such a layout of the cooling arrangement is possible, however, only for field windings of relatively small machines.

SUMMARY OF THE INVENTION

It is an object of the present invention to improve the cooling arrangement mentioned at the outset in such a manner that excessive increases of the coolant vapor pressure in the transition from the superconducting to the normally conducting state are prevented, even in relatively large magnet windings.

According to the present invention, this problem is solved by additionally connecting a buffer tank to the vapor space occupied by the gaseous phase via a connecting path with a relatively small flow resistance.

The advantages of this design of the cooling arrangement are in particular that the large quantities of coolant vapor occurring in the event of a quench can also immediately get into the buffer tank. By increasing the available volume, a corresponding decrease of the pressure rise is achieved. The pressure rise of such an arrangement is then smaller approximately by the ratio of the vapor volume without a pressure buffer to the vapor volume with the pressure buffer as compared to arrangement without buffer tank. Through a buffer tank of sufficiently large volume, the pressure rise in the cooling arrangement can therefore be limited to a harmless pressure value.

If the cooling arrangement according to the present invention is provided for the superconducting field winding in the rotor of a turbo-generator, the buffer tank can advantageously be arranged in the rotor at least at one of its end faces. For, while the dimensional extent of the coolant chamber in the interior of the rotor body is very limited, a relatively large volume can be made available, on the other hand, at the two end faces, which is otherwise not needed and results from the axial extension of the torque transmitting parts of the rotor body.

BRIEF DESCRIPTION OF THE DRAWINGS

The single FIGURE is a schematic diagram of an embodiment of an arrangement for cooling a superconducting magnet winding according to the present invention.

DETAILED DESCRIPTION

Since the cooling arrangement according to the present invention can be provided to particular advantage for a superconducting field winding in the rotor of an electric machine, especially of a turbo-generator, that part of the rotor of such a machine which is facing away from the drive side is indicated in the FIGURE in a longitudinal section. The rotor parts not detailed in the figures correspond to parts of known machines with superconducting field windings.

A rotor body 3 of the machine, which is not detailed in the FIGURE and is rotatably supported about an axis 2, contains a corotating hollow cylindrical vacuum jacket 4, which defines, in the radial direction, a vacuum space 5 which encloses a cylindrical winding support 6. In this winding support, a field winding 7, only indicated by a block in the FIGURE, is arranged. Since the conductors of this winding are to contain superconductive material, they are held at the operating temperature using liquid helium as the coolant. For this purpose, a coolant chamber 9 is provided which receives all the coolant required for cooling the field winding 7. The liquid helium to be fed into the coolant chamber 9 is taken from an external coolant supply unit and is transferred from the stationary line parts at a coolant connecting head into a central corotating feed line 10 by means of a so-called helium coupler, not shown in the FIGURE. A suitable helium coupler is known, for instance, from the publication "Siemens-Forschungsund Entwicklungsberichte", vol. 5 (1976), no. 1, page 13. At the end 11 of the coolant feed line 10 extending into the coolant chamber 9 the liquid coolant is introduced into the coolant chamber. In the operating condition of the machine, and under the influence of centrifugal forces when the rotor revolves, the liquid phase of the helium, designated as A, then accumulates in regions of this chamber away from the axis and occupies a liquid space 13, while a vapor space 14, occupied by a gaseous phase B of the coolant, develops centrally around the axis. The liquid phase A of the coolant is utilized for cooling the superconducting field winding by letting it flow through the coolant paths in the winding, not shown in the FIGURE. The flow can be due, for instance, to a self-pumping effect in thermosiphon loops (see, for instance, the dissertation of A. Bejan: "Improved Thermal Design of the Cryogenic Cooling System for a Superconducting Synchronous Generator", PhD Thesis, Massachusetts Institute of Technology, USA, December 1974, pages 145–167). Furthermore, cooling canals which end in the field winding and are flooded with the coolant may also be provided (see, for instance, Report of the Electric Power Research Institute, USA: "EPRI EL-663, vol. 1, Project 429-2, Final Report", March 1978, pages 3-10 and 3-11). The parts of coolant in phase B, which have been evaporated due to losses in the winding and have accumulated centrally in the coolant chamber 9, are partly discharged from the vapor space 14 via a coolant exhaust gas line 16, which, for instance, may concentrically surround the central feed line 10.

Before the coolant exhaust gas leaves the rotor, it is generally also used for cooling further parts of the rotor body 3. The coolant exhaust gas line is made accordingly long. In addition, its cross section must as a rule be made relatively small for space reasons. For, a large flow cross section would favor heat transport through coolant convection and thereby cause additional losses. The flow resistance of this exhaust gas line is therefore relatively high. If now a so-called quench, i.e., a sudden transition from the superconducting state to the normally conducting state occurs in the field winding 7, the helium A, which cools the field winding, is evaporated in the process in a short time. Since, however, the flow resistance of the coolant exhaust gas line 16 is high, the amount of exhaust gas produced cannot be discharged from the coolant chamber 9 fast enough, so that a correspondingly large pressure increase in the interior of the rotor body 3 could be expected. This, however, is prevented, according to the present invention, by connecting to the coolant chamber 9 at least one large volume buffer tank, the volume of which is at least as large as the entire volume of the coolant chamber 9, preferably at least 4 times as large as the coolant chamber volume. For, while the physical extent of the coolant chamber 9 at the center of the rotor body is very limited, relatively large spaces are available at the two end faces. These spaces result from the torque transmitting parts of the rotor body, which must be made relatively long for thermal reasons, and are not needed otherwise. Accordingly, as shown in the embodiment of the FIGURE, a substantially annular buffer tank 17 is provided, which is connected via a large connecting path 18 to the vapor space 14 which develops when the machine is in operation. Due to the low flow resistance of the connecting path 18, which is advantageously at least 10 times smaller than the flow resistance of the coolant discharge line 16, a pressure equilibrium between the buffer tank 17 and the volume of the coolant chamber 9 occupied by the evaporated coolant adjusts itself in a practically unimpeded manner. The pressure appearing in case of a quench is then lower approximately by the ratio of the volume of the coolant chamber 9 without a buffer tank space to this volume with a buffer tank space, as compared to an embodiment without a buffer tank. In superconducting synchronous generators, an increase of the volume available to the coolant vapor or a reduction of the pressure by at least a factor of 2, for instance, by a factor of 3 to 5, is possible in this manner in an advantageous way.

With the cooling arrangement of the present invention it is further ensured that liquid helium coming from the coolant feed line 10 cannot flow directly into the buffer tank 17. The coolant feed line 10 therefore extends into the vapor space 14 of the coolant chamber 9 far enough that the connecting path 18 to the buffer tank 17 is connected to the vapor space at a sufficient distance from the opening point 11 of the coolant feed line 10. The opening radius of the connecting point designated as 19 is fixed, for instance, by a washer-shaped orifice 20 which is arranged concentrically to the axis, in such a manner that it is smaller than the radius of the phase boundary between the coolant vapor B developed when the machine is in operation, and the coolant liquid A. In this manner the buffer tank 17 is prevented from being filled with liquid coolant.

While it is particularly advantageous to provide such buffer tanks at least at one of the end faces of the rotor of an electric machine with a superconducting field winding, such buffer tanks can also be used for non-rotating, bath cooled magnet windings if only a relatively limited coolant volume is available and the flow resistance of the exhaust gas line that must be provided is too high for discharging the large quantities of coolant vapor, which are produced in case of a quench, sufficiently fast.

What is claimed is:

1. In an arrangement for cooling a superconducting magnet winding, especially the superconducting field winding in the rotor of an electric machine, said arrangement including; at least one coolant chamber which, in the operating condition, contains a gaseous phase and a liquid phase of a coolant; at least one feed line for feeding coolant to said chamber; coolant paths through the magnet winding connecting to a liquid space in the chamber occupied by the liquid phase; and at least one coolant discharge line with a predetermined high flow resistance connected to a vapor space in the chamber occupied by the gaseous phase, the improvement comprising:
   (a) a buffer tank; and
   (b) a connecting path having a relatively low flow resistance connecting said buffer tank to the vapor space occupied by the gaseous phase.

2. The improvement according to claim 1, wherein the flow resistance of said connecting path is at least 10 times smaller than the flow resistance of the coolant discharge line.

3. The improvement according to claim 1 or 2, wherein the volume of said buffer tank is at least as large and preferably, at least four times as large as the volume of the coolant chamber.

4. The improvement according to claim 1 for the superconducting field winding in the rotor of an electric machine, especially of a turbo-generator, wherein a buffer tank is disposed in the rotor at least at one of its end faces.

5. The improvement according to claim 4, wherein the connecting point of the connecting path to the buffer tank is disposed on the coolant feed-in and discharge side of the rotor behind, as seen in the flow direction of the fed in coolant, the end opening of the coolant feed line.

6. The improvement according to claim 4 or 5, wherein the coolant feed line extends for a distance into the coolant chamber.

7. The improvement according to claim 5, wherein the flow resistance of said connecting path is at least 10 times smaller than the flow resistance of the coolant discharge line.

8. The improvement according to claim 5, wherein the volume of said buffer tank is at least as large and preferably, at least four times as large as the volume of the coolant chamber.

* * * * *